UNITED STATES PATENT OFFICE.

LAURENCE EMBREY, OF FENTON, ENGLAND.

BAKING.

1,169,023.  Specification of Letters Patent.  Patented Jan. 18, 1916.

Application filed October 5, 1915. Serial No. 54,243.

*To all whom it may concern:*

Be it known that I, LAURENCE EMBREY, a subject of the King of Great Britain, residing at Fenton, Staffordshire, England, have invented certain new and useful Improvements in Baking, of which the following is a specification.

This invention relates to the moistening of the heated air within bakers' ovens and to a method of improving the bread, either plain or fancy, baked in these ovens.

The proper development of bread during baking requires the maintenance of the outer skin in an elastic state. If the outer skin becomes hard and brittle at an early stage it will not stretch as the loaf rises. The result is that the outer skin in time peels and does not form what is known as a "good bloom." Loaves usually rise chiefly on one side—the side most remote from the hot walls, and with a dry outer skin this rising is apt to cause malformation of the bread or objectionable bursting of the crust. The hardening of the crust is also apt to stifle the development and lead to the production of inferior bread. If the skin of the loaf is kept properly moist for a fairly protracted period during the early stages of baking the result is that the loaf comes out with a glazed crust. Great difficulty has heretofore been found in getting a glaze on bread and it has been impossible to have the degree of moisture so regulated that the desired effect can be obtained in any oven.

The methods hitherto employed for obtaining a moist atmosphere in bakers' ovens fall under three main categories. (*a*) Those in which steam is generated in a vessel outside the oven chamber, either in a flue of the oven or quite outside the oven and admitted into the oven chamber. (*b*) Those in which water was placed in open or closed vessels within the oven. (*c*) Another method has been to brush or spray the dough with water before entry into the oven. The last method is unsatisfactory as it is impossible to insure uniform moistening of the dough, that is the deposit of a thin uniform film of moisture all over the dough. The second method is not under control as regards the timing of the moistening effect or the degree, so that the baker must to some considerable extent trust to luck or make a compromise. Further, the presence of water in the oven tends to produce local cooling and the character and quality of wetness of the steam is not under control. The first method (*a*) above obviates most of these disadvantages as the supply of steam and the exact moment of its injection may be controlled. I have found, however, that it is impossible to get the right quality and quantity of steam into the oven in this manner. After careful experiment I have discovered that the best results are obtained by producing the moistening vapor indirectly from steam.

According to this invention the bread is placed in the oven chamber, whereupon vapor produced by passing steam through water is injected into the oven chamber.

I attribute the remarkable difference in the action of directly generated steam and indirectly generated water vapor to the presence in the cloud of water vapor of evenly distributed globules of water which rapidly and uniformly permeate every part of the oven and deposit on the dough, owing to its being cooler than the walls of the oven, a thin uniform film of moisture. The globules of water are already deprived to a considerable extent of their latent heat and produce a local skin cooling and moistening effect which delays the formation of a hard crust and facilitates the production of a skin with a high degree of elasticity.

In carrying the invention into effect according to the form shown in Fig. 1, live steam conveniently at a pressure of about 40 lbs. is led by a pipe $a$ under the control of a valve $b$ into a vessel $c$. The vessel $c$ contains water supplied through a filler $d$, having a valve $e$ in the connection from the filler $d$ to the chamber $c$. The steam pipe $a$ prefer- G. B. FLETCHER.
COMBINED WINDOW SHADE BRACKET AND LACE CURTAIN HANGER.
APPLICATION FILED MAR. 27, 1915.
1,169,024.
Patented Jan. 18, 1916.
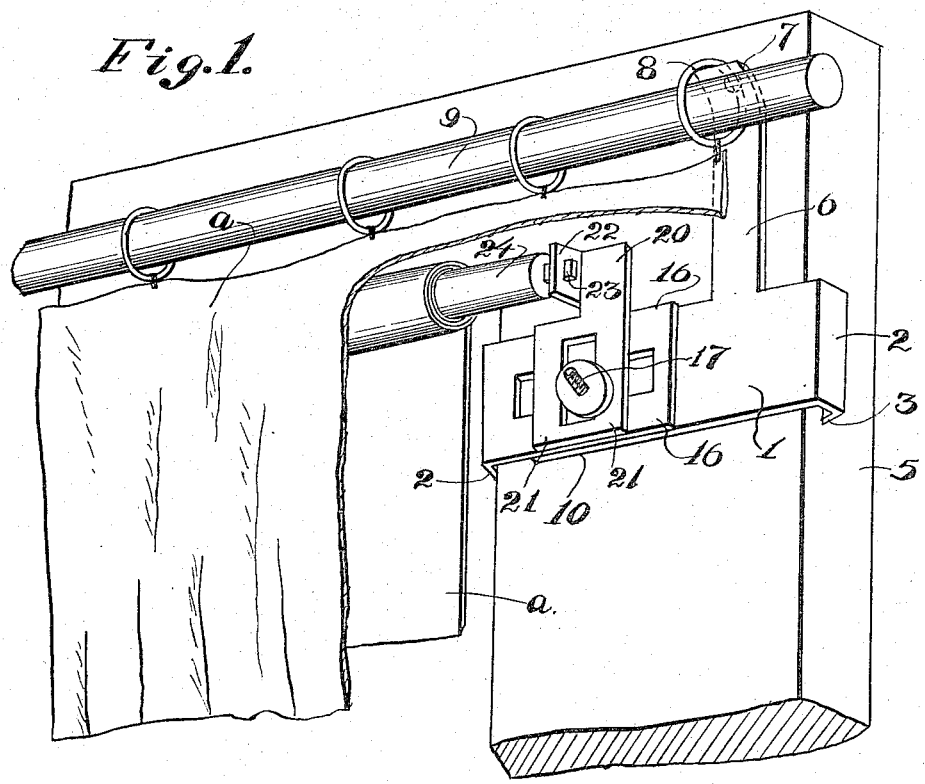
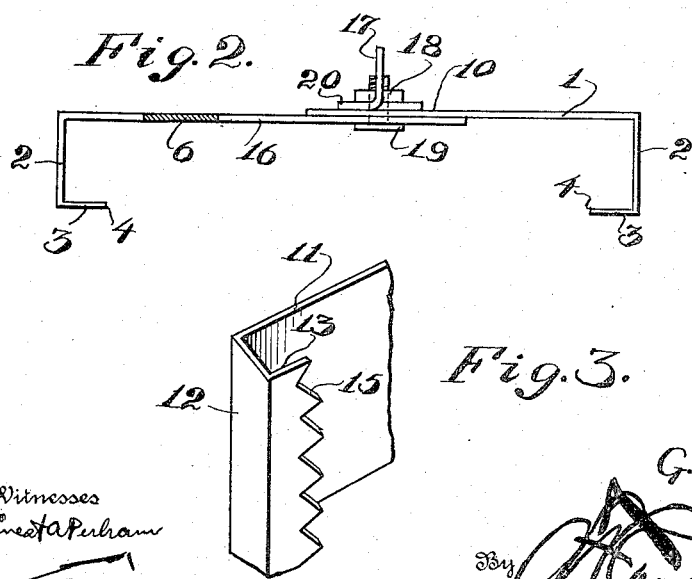

The invention will now be described with reference to the accompanying drawings, in which, Figure 1 is a sectional elevation of a two deck oven with the invention applied using external generation of the vapor cloud. Fig. 2 is a cross section of a single deck oven with internally generated water vapor. Fig. 3 is a cross section of the vapor generator. Figs. 4 and 5 are modified sections of the vapor generator.